(12) United States Patent
Kang et al.

(10) Patent No.: US 7,702,070 B2
(45) Date of Patent: Apr. 20, 2010

(54) DEVICE AND METHOD FOR INSPECTING CONTRABAND IN AVIATION CARGO CONTAINER

(75) Inventors: Kejun Kang, Beijing (CN); Ziran Zhao, Beijing (CN); Hua Peng, Beijing (CN); Zhiqiang Chen, Beijing (CN); Yuanjing Li, Beijing (CN); Yinong Liu, Beijing (CN); Li Zhang, Beijing (CN); Yaohong Liu, Beijing (CN); Zhizhong Liang, Beijing (CN); Dongmao Li, Beijing (CN); Cong Liu, Beijing (CN); Huabin Tan, Beijing (CN); Yongpeng Liu, Beijing (CN); Xinhui Duan, Beijing (CN); Xueyou Zhou, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 12/204,491

(22) Filed: Sep. 4, 2008

(65) Prior Publication Data
US 2009/0060128 A1 Mar. 5, 2009

(30) Foreign Application Priority Data
Sep. 5, 2007 (CN) ........................ 2007 1 0121403

(51) Int. Cl.
*G01N 23/04* (2006.01)
(52) U.S. Cl. ........................................ 378/57; 378/195
(58) Field of Classification Search ................... 378/57, 378/193, 195, 196, 197, 208, 209
See application file for complete search history.

(56) References Cited

U.S. PATENT DOCUMENTS 3,766,387 A 10/1973 Heffan et al.

(Continued)

FOREIGN PATENT DOCUMENTS

CN 101071111 A 11/2007

(Continued)

OTHER PUBLICATIONS

Great Britain Search Report dated Dec. 22, 2008 issued in corresponding GB Application No. 0816148.1.

(Continued)

*Primary Examiner*—Hoon Song
(74) *Attorney, Agent, or Firm*—Kenyon & Kenyon LLP

(57) ABSTRACT

A device for inspecting contraband in an aviation cargo containers includes: a turntable located at an object inspecting position and configured to carry the object to be inspected and bring the object into rotation; an object conveying system; a scanning system including a radiation source and a detector which can synchronously move in the vertical direction; a turntable drive/control system which drives and controls rotation of said turntable so that the turntable can continuously rotate about its rotation axis or rotate to any predetermined angular position; a scanning drive/control system which drives and controls the radiation source and the detector into synchronous movement in the vertical direction so that the radiation source and the detector can continuously move in the vertical direction or move to any predetermined vertical position. The device of the present invention can scan the object and form images in various scanning modes to meet different needs.

14 Claims, 2 Drawing Sheets

U.S. PATENT DOCUMENTS

| | | |
|---|---|---|
| 4,472,822 A | 9/1984 | Swift |
| 4,989,225 A | 1/1991 | Gupta et al. |
| 7,062,011 B1 | 6/2006 | Tybinkowski et al. |
| 2004/0109532 A1 * | 6/2004 | Ford et al. .................... 378/57 |
| 2008/0084962 A1 | 4/2008 | Zhang et al. |
| 2008/0165934 A1 | 7/2008 | Hua et al. |

FOREIGN PATENT DOCUMENTS

| | | |
|---|---|---|
| CN | 101210892 A | 7/2008 |
| GB | 2420683 | 5/2006 |
| GB | 2 438 055 | 11/2007 |
| RU | 2234451 | 8/2004 |
| SU | 424802 | 4/1974 |
| SU | 863509 | 9/1981 |

OTHER PUBLICATIONS

Russian Office Action dated Sep. 25, 2009 issued in Russian Application No. 2008135770.

* cited by examiner

DEVICE AND METHOD FOR INSPECTING CONTRABAND IN AVIATION CARGO CONTAINER

CROSS-REFERENCE TO RELATED APPLICATIONS

The present application claims priority to Application No. 200710121403.1, filed in the People's Republic of China on Sep. 5, 2007, which is expressly incorporated herein in its entirety by reference thereto.

FIELD OF THE INVENTION

The present invention relates to cargo security inspection, particularly to a device and a method for inspecting contraband in an aviation cargo.

BACKGROUND INFORMATION

Currently, aviation cargo such as an aviation container is still mainly inspected via manual inspection and X-ray tube transmission (only small-sized aviation containers can pass for inspection). Devices using CT (computed tomography) technology are also configured for cargo inspection, for example products of Smith Corporation using X-ray tubes and products of Hualixing Company using a radiation source. The above two types of products are greatly limited in use because an X-ray tube exhibits a relatively poor penetration capability and radiation sources are strictly controlled in use and management. In particular, these devices all employ horizontal passing type scanning to conduct CT imaging inspection, i.e., the object to be inspected passes horizontally, and a scanning system rotates around the travel path of the object such that these CT inspecting systems exhibit a relatively low cargo passing rate. Furthermore, this CT inspecting system is strictly limited by structure and dimensions and penetration ability, so said system cannot be configured to inspect aviation containers with relatively large dimensions. For instance, the present-day devices cannot inspect an aviation container two meters long and two meters wide. Furthermore, the above horizontal passing type scanning requires occupation of the same area of ground on the left and right sides of the cargo passageway, so such device occupies a relatively large space.

In addition, in the prior art many kinds of radiation imaging modes such as transmission imaging, multi-viewing angle imaging and CT imaging have been advanced. Said different imaging modes generally correspond to different cargo-scanning modes of scanning systems. The above prior art inspective devices can generally only realize one of the scanning modes so that the selection of imaging modes is limited. However, during cargo inspection, sometimes the same cargo needs to be scanned for imaging in different modes. The current inspection devices do not meet this need.

SUMMARY

An object of the present invention is to overcome at least one of the above drawbacks in the prior art.

To realize the above object, example embodiments of the present invention provide a device for inspecting contraband in an aviation cargo container, including:

a turntable located at an object inspecting position and configured to carry the object to be inspected and bring the object into rotation;

an object conveying system for conveying the object in a horizontal direction to the turntable and away from the turntable upon completion of inspection;

a scanning system which is arranged around the turntable and configured to scan the object to acquire imaging data, the scanning system including a radiation source and a detector which can synchronously move in the vertical direction;

a turntable drive/control subsystem which drives and controls rotation of said turntable so that the turntable can continuously rotate about its rotation axis or rotate to any predetermined angular position;

a scanning drive/control sub-system which drives and controls the radiation source and the detector into synchronous movement in the vertical direction so that the radiation source and the detector can continuously move in the vertical direction or move to any predetermined vertical position; and a main control computer providing a man-machine interaction interface to control the work of the device according to the operator's instructions. The computer also has several responsibilities, such as data processing, image reconstruction, image display.

According to an example embodiment, the turntable can continuously rotate or rotate to any predetermined angular position, and the scanning system (including a radiation source and a detector) can continuously move in the vertical direction or move to any predetermined vertical position. By virtue of combination of different movement modes of the turntable and the scanning system, the device of the present invention can scan the object in various scanning modes. An operator may select one or more scanning modes as practically needed to scan the object, then conduct imaging of the object in different modes in cooperation with the corresponding algorithm to meet different needs. Therefore, the device of the present invention is a multi-functional comprehensive inspection system.

DETAILED DESCRIPTION

Figure 1:
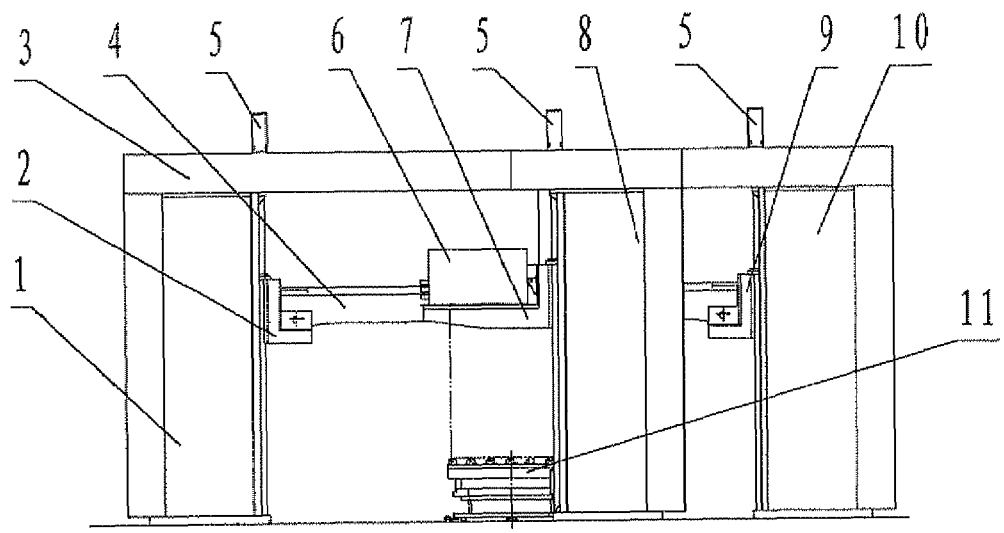
FIG. 1 is a side view of the device according to an embodiment of the present invention.
Figure 2:
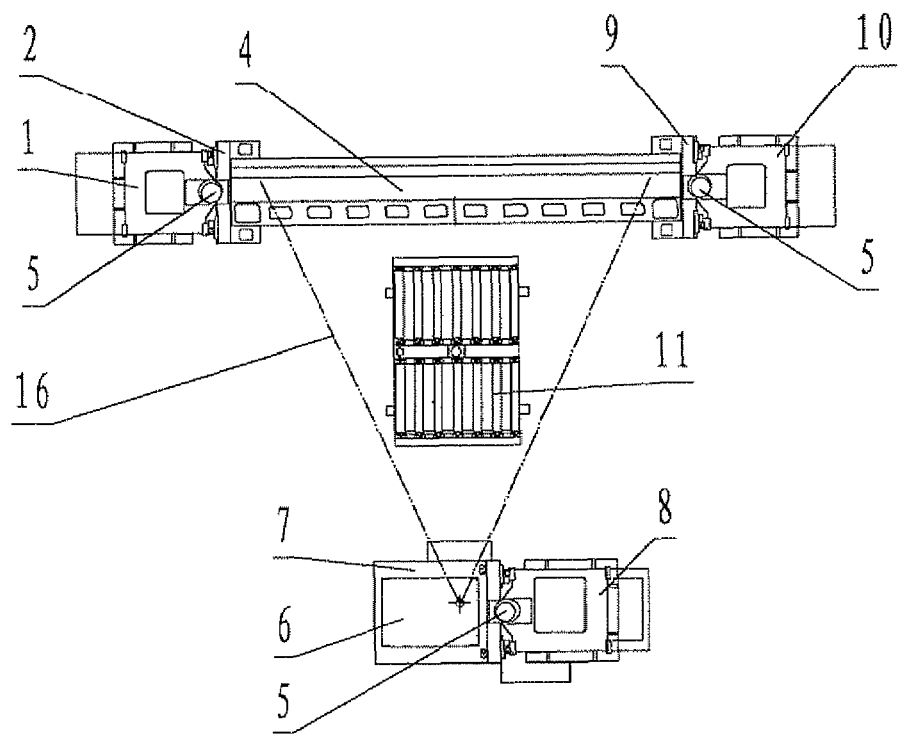
FIG. 2 is a top view of the device according to the embodiment as shown in FIG. 1.
Figure 3:
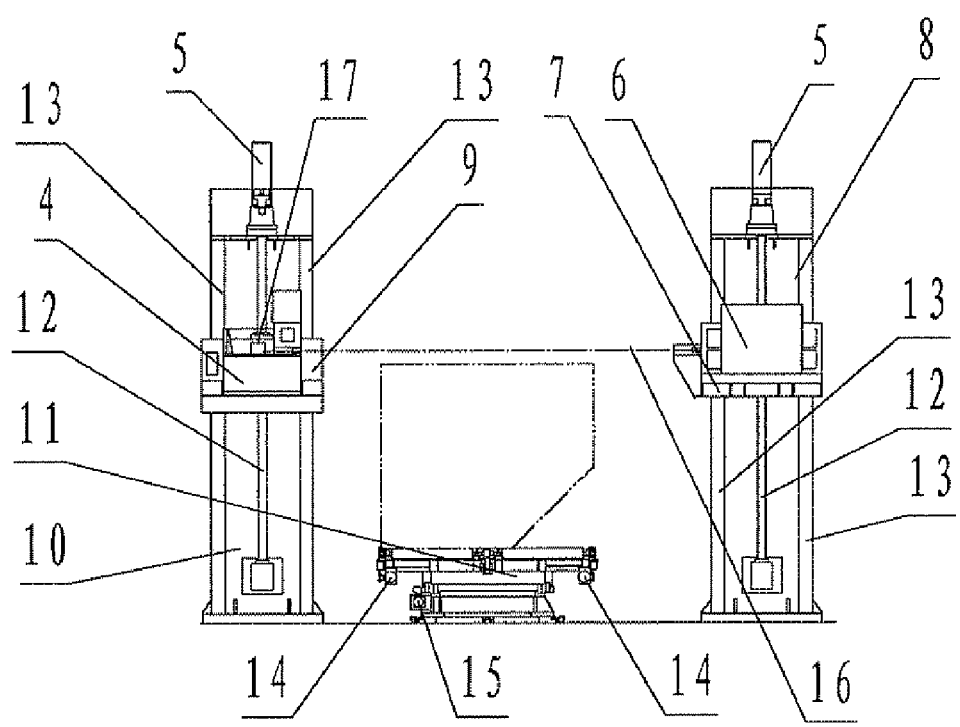
FIG. 3 is a left view of the device according to the embodiment as shown in FIG. 1.

FIGS. 1 to 3 show an example embodiment of the device for inspecting contraband in aviation cargo transport container according to the present invention. As shown in said figures, the device includes a turntable 11 located at an object inspecting position and configured to carry the object (not shown) such as an aviation container to be inspected and bring the object to be inspected into rotation. The device further includes an object conveying system (not shown) for conveying the object in a horizontal direction to the turntable and away from the turntable upon completion of inspection, which is well known in the art. The object conveying system and the turntable are together called conveyance system. The turntable 11 is situated on a conveyance path of the object conveying system. In an example embodiment, the turntable 11 is a composite rotary conveying worktable. Commonly owned Chinese patent application No. 200610169797.3, which is expressly incorporated herein in its entirety by reference thereto, discloses a composite rotary conveying worktable. The composite rotary worktable can not only convey the object to be inspected through a scanning passage, but also support and bring the object into rotation in the scanning passage. As such, when the object is to be scanned during rotation, the scanning system (to be described in detail hereafter) is allowed to not rotate about the object, but the object itself rotates.

The device further includes a turntable drive/control subsystem (not shown) which drives and controls rotation of said turntable so that the turntable can continuously rotate about its rotation axis or rotate to any predetermined angular position. The turntable drive/control subsystem generally includes an electrical motor and a servo controller for said electrical motor.

The device further includes a scanning system which is arranged around the turntable and configured to scan the object to acquire imaging data. As shown in the figures, the scanning system includes a radiation source 6 and a detector 17 on both sides of the turntable 11. Said radiation source 6 and said detector 17 can synchronously move in the vertical direction to ensure a horizontal ray surface or plane 16 emitted from said radiation source 6 and the plane where the detector 17 is located are forever in the same horizontal surface or plane. Said radiation source 6 emits controllable X-rays or gamma rays and can be an electronic linear accelerator, isotope source, or an X-ray tube. The detector 17 converts the rays passing through the object into electrical signals and may be, e.g., a solid detector or a gas detector. The detector, in structural form, may employ one or a plurality of linear or arc arrays or high or low energy detector. The scanning system may further include a data collector for converting the electrical signals of the detector into digital signals and transmitting them to a main control computer via a bus or Ethernet. The detector 17 itself may carry the data collector.

The scanning system further includes a radiation source mounting structure for mounting the radiation source 6 and a detector mounting structure for mounting the detector 17. Said radiation source mounting structure and said detector mounting structure are disposed on both sides of the turntable 11. Said radiation source mounting structure and/or said detector mounting structure includes one or more column assemblies. In an example embodiment, each of said radiation source mounting structure and said detector mounting structure includes one or more column assemblies. In an example embodiment, each column assembly has substantially the same structure. In FIGS. 1 to 3, the radiation source mounting structure includes a single column assembly, and the detector mounting structure includes two column assemblies so as to form a scanning frame in a three-column form. Such three-column structure reduces the area of occupation to a maximum extent under the circumstance that stable mounting of the detector and the radiation source is ensured. In addition, to further reduce the area of occupation, the detector disposed at the two column assemblies is preferably a planar detector array. A detector array in a planar form occupies less area than a detector array in a form of a curved surface.

In FIGS. 1 to 3, the column assemblies include columns 8, 1, or 10 disposed in the vertical direction, wherein the column assembly for the radiation source mounting structure includes the column 8, and the two column assemblies for the detector mounting structure respectively include the column 1 and the column 10. An elevation mechanism is provided on each column in the extending direction of the column and supported by the column, and the radiation source or the detector is mounted on the elevation mechanism. Each elevation mechanism includes a roller leading screw, i.e., leadscrew, 12 and an elevating platform 7, 2, or 9 provided along the column. Of the elevating platforms, as shown in FIGS. 1 to 3, the reference numeral 7 denotes an elevating platform in the column assembly in the radiation source mounting structure and the reference numerals 2 and 9 respectively denote elevating platforms in the two column assemblies in the detector mounting structure. The elevating platform 7, 2, or 9 is mounted on and in threaded connection with the leading screw, i.e., leadscrew, 12, and the radiation source 6 or the detector 17 is correspondingly fixedly mounted on the elevating platform. As such, when the leading screw 12 rotates, the elevating platform 7, 2, or 9 can ascend and descend along the leading screw 12 due to interaction with the threads of the leading screw 12. In an example embodiment, the elevating platform can be in threaded connection with the leading screw via a nut, wherein the nut is in threaded connection with the leading screw and is fixedly connected to the elevating platform. In another example platform, the elevating platform itself includes a threaded passage running therethrough, wherein the threaded passage is in threaded connection with the leading screw. The elevating mechanism may further include at least one guiding rail disposed along the column, where the elevating platform may slide along the guiding rail so that the guiding rail guides the elevating platform to ascend and descend. As shown in the figures, the elevation mechanism includes two guiding rails 13 disposed on both sides of the leading screw 12. In an example embodiment, the elevating platform is in sliding connection with the guiding rails via a slider, wherein the slider is in sliding connection with the guiding rail and is fixedly connected to the elevating platform. It should be further appreciated that the elevating platform may include a passage running therethrough, the guiding rail extending through the passage.

When the detector mounting structure or the radiation source mounting structure includes a plurality of column assemblies, the mounting structure may further include a connection beam connected between each pair of adjacent columns in order to realize structural stability between the column assemblies. As shown in FIGS. 1 to 3, in the detector mounting structure a connection beam 3 is connected between the columns 1 and 10.

When the detector mounting structure includes a plurality of column assemblies, the mounting structure may further include a cross beam connected between each pair of adjacent elevating platforms, wherein the detector (e.g., a planar detector array) is fixedly mounted on the cross beam and thus fixedly mounted on the elevating platform via the cross beam. As shown in FIGS. 1 to 3, in the detector mounting structure, the cross beam 4 is connected between the elevating platforms 2 and 9, and the detector 17 is connected to the cross beam 4. Due to rigid characteristic of a mechanical structure, in order to reduce requirement for the manufacturing precision, particularly the mounting precision of the rigid structure, both ends of the cross beam 4 are respectively connected to the connection points of the detector elevating platforms 2, 9 with one end being fixedly hinged, and the other end elastically coupled so that the detector cross beam 4 can normally synchronously travel during the scanning operation.

Example embodiments of the present invention may further include a scanning drive/control sub-system which drives and controls the radiation source and the detector into synchronous movement in the vertical direction so that the radiation source and the detector can continuously move in the vertical direction or move to any predetermined vertical position. The scanning drive/control sub-system includes a servo driving motor 5 for driving the leading screw 12 in the column assemblies, and a servo synchronous controller (not shown) for controlling the synchronous operation of the servo drive electrical motor 5. When the device is a three-column frame, the servo synchronous controller may be a three-axis servo synchronous controller.

The example device may further include a main control computer. The controlling portions of the turntable drive/control subsystem and the scanning drive/control sub-system may be performed, in specific implementation, by a single control system which can be, for example, realized by the main control computer and a special software in said main control computer. The main control computer may provide a man-machine interaction interface to control the work of the device according to the operator's instructions and to form and display images according to imaging data. For example, the operator may, via the man-machine interaction interface, input some parameters like the continuous rotation angle or predetermined angular position of the turntable, continuous movement length or predetermined vertical position of the radiation source or the detector, to the turntable drive/control subsystem and the scanning drive/control subsystem. As such, the operator can control the device to scan the object in various forms. Furthermore, the main control computer may conduct imaging by using the imaging data acquired by the scanning system according to a certain data processing algorithm.

As above discussed, the device according to the present invention may inspect an object in various working modes. Such modes may, for example, include:

(1) transmission planar imaging mode, where the turntable brings the object to at least one predetermined angular position; when the object is at each predetermined angular position, the radiation source and the detector synchronously scan once in the vertical direction to obtain transmission image data at all the predetermined angular positions; the device respectively forms 2-dimensional transmission images when the object is at each predetermined angular position according to the transmission image data at each predetermined angular position.

(2) Multi-viewing 3-D imaging mode, where the turntable brings the object to a plurality of predetermined angular positions; when the object is at each predetermined angular position, the radiation source and the detector synchronously scan once in the vertical direction to obtain transmission image data at all the predetermined angular positions; the device reconstructs a 3-D image of the object according to the transmission image data at the predetermined angular positions. For the algorithm used in the multi-viewing 3-D imaging mode, commonly owned Chinese patent application No. 200610076574.2, which is expressly incorporated herein in its entirety by reference thereto, provides an example thereof.

(3) 2-D CT (Computerized tomography) imaging mode, where the radiation source or the detector is positioned at least one predetermined vertical position; when the radiation source and the detector are positioned at each predetermined vertical position, the turntable brings the object into continuous rotation to acquire CT projection data at the predetermined vertical positions; the device reconstructs a 2-D cross-section image of the object at the predetermined vertical positions according to the CT projection data at the predetermined vertical positions.

(4) Helical CT imaging mode, where the radiation source and the detector move from a first predetermined vertical position to a second predetermined vertical position in the vertical direction; meanwhile, the turntable brings the object into continuous rotation so as to spirally scan the object and obtain CT spiral scanning data of the object between the first predetermined vertical position and the second predetermined vertical position, said device reconstructs a 3-D tomography image (volume data) of the object between the first predetermined vertical position and the second predetermined vertical position according to the CT spiral scanning data.

The above modes are only exemplary. It is noted that the turntable can rotate or continuously rotate to any predetermined angular position, while the scanning system (including the radiation source and the detector) are movable or continuously movable to any predetermined vertical position in the vertical direction. A person skilled in the art can obtain various possible working modes of the device of the present invention by studying different combinations of the movement modes of the turntable and the scanning system of the device of the present invention. The operator may select one or more of the various possible working modes to inspect the object.

The device according to the present invention may conduct quick inspection of large and medium-sized cargo such as standard-sized aviation containers and provide radiation images, such as transmission planar images, CT slice planar images and 3-D volume images (by using multi-viewing imaging method or the spiral CT method), indicative of shape and density distribution of the cargo contained in the aviation container. An inspector can finally quickly judge whether the cargo conforms to that declared and if there is any contraband so as to perform accurate and effective security inspection by analyzing the characteristic information of the object provided by the device.

An exemplary working procedure of the device according to the present invention will be described as follows:

Step (1): convey the object to the turntable 11.

In steps (2)-(4), use the device of the present invention to inspect the object in the transmission planar imaging mode.

Step (2): the turntable 11 is stationary, the radiation source 6 and the detector 17 synchronously scan once in the vertical direction to obtain transmission image data of the object at the current angular position.

Step (3): the turntable 11 rotates 90 degrees and executes the step (2) once again to obtain another transmission image data.

Step (4): display the transmission images from steps (2) and (3) on the screen of the computer, and the operator analyzes the two transmission images and turns to step (8) if a suspected area is found.

In steps (5)-(7), using the device of the present invention to inspect the object in the multi-viewing 3-D imaging mode.

Step (5): the turntable 11 rotates a relatively small angle, e.g., an angle from 10 degrees to 30 degrees, and step (2) is executed once more.

Step (6): repeatedly execute step (5) ten times.

Step (7): reconstruct a 3-D image of the object using the above obtained 12 transmission image data via data processing; turn to step (8) if a suspected area is found; otherwise the object passes the inspection.

In step (8), use the device of the present invention to scan the suspected area in CT imaging mode or helical CT imaging mode. Specifically, the radiation source 6 and the detector 17 are positioned at the level of the suspected area, and the turntable 11 brings the object into continuous rotation. In the CT mode, the radiation source 6 and the detector 17 remain stationary, acquire CT projection data at the current position, and reconstruct a 2-D cross-section image via data processing. In the helical CT imaging mode, the radiation source 6 and the detector 17 scan in the vertical direction within the scope of the suspected area so as to acquire the CT projection data of the suspected area and reconstruct a 3-D tomography volume image via data processing.

Step (9): the operator makes a final judgment through the tomography image.

What is claimed is:

1. A device for inspecting contraband in an aviation cargo container, comprising:
   a turntable located at an object inspecting position and configured to carry the object to be inspected and bring the object into rotation;
   an object conveying system for conveying the object in a horizontal direction to the turntable and away from the turntable upon completion of inspection;
   a scanning system which is arranged around the turntable and configured to scan the object to acquire imaging data, the scanning system comprising:
      a radiation source;
      a radiation source mounting structure for mounting the radiation source, said radiation source mounting structure including only one column assembly;
      a detector which can synchronously move in the vertical direction; and
      a detector mounting structure, said detector mounting structure including two column assemblies and a cross beam, said detector being fixedly mounted on the cross beam;
   a turntable drive/control subsystem which drives and controls rotation of said turntable so that the turntable can at least one of (a) continuously rotate about its rotation axis and (b) rotate to a predetermined angular position; and
   a scanning drive/control sub-system which drives and controls the radiation source and the detector into synchronous movement in the vertical direction so that the radiation source and the detector can at least one of (a) continuously move in the vertical direction and (b) move to any predetermined vertical position;
   wherein:
      each of said column assemblies includes:
         a column disposed in the vertical direction; and
         an elevating mechanism disposed along and supported by the respective column, and including (a) a rotatable leading screw disposed along the respective column, and (b) an elevating platform mounted on and being in threaded connection with the respective leading screw, and arranged for, when the respective leading screw is rotated, ascending and descending alone the respective leading screw due to interaction with threads of the respective leading screw; and
      said cross beam is connected between the elevating platforms of the two column assemblies of said detector mounting structure, said detector being fixedly connected on the elevating platforms via the cross beam.

2. The device according to claim 1, wherein the device is arranged to inspect the same object in at least one of a plurality of working modes.

3. The device according to claim 1, wherein the device is arranged to inspect the same object in at least two of a plurality of working modes.

4. The device according to claim 2, wherein the at least one working mode from said plurality of working modes is selected from:
   transmission planar imaging mode, wherein:
      the turntable brings the object to at least one predetermined angular position;
      when the object is at each predetermined angular position, the radiation source and the detector synchronously scan once in the vertical direction to obtain transmission image data at each of the predetermined angular positions; and
      the device respectively forms 2-dimensional transmission images when the object is at each predetermined angular position according to the transmission image data at each predetermined angular position;
   multi-viewing 3-D imaging mode, wherein:
      the turntable brings the object to a plurality of predetermined angular positions;
      when the object is at each predetermined angular position, the radiation source and the detector synchronously scan once in the vertical direction to obtain transmission image data at each of the predetermined angular positions; and
      the device reconstructs a 3-D image of the object according to the transmission image data at each of the predetermined angular positions;
   2-D CT imaging mode, wherein:
      the radiation source and the detector is positioned at least one predetermined vertical position;
      when the radiation source and the detector are positioned at each predetermined vertical position, the turntable brings the object into continuous rotation to acquire CT projection data at each of the predetermined vertical positions; and
      the device reconstructs a 2-D cross-section image of the object at each of the predetermined vertical positions according to the CT projection data at each of the predetermined vertical positions; and
   helical CT imaging mode, wherein:
      the radiation source and the detector move from a first predetermined vertical position to a second predetermined vertical position in the vertical direction while the turntable brings the object into continuous rotation so as to spirally scan the object and obtain CT spiral scanning data of the object between the first predetermined vertical position and the second predetermined vertical position; and
      said device reconstructs a 3-D tomography volume image of the object between the first predetermined vertical position and the second predetermined vertical position according to the CT spiral scanning data.

5. The device according to claim 1, wherein said turntable is a composite rotary conveying worktable.

6. The device according to claim 1, wherein the radiation source is fixedly mounted on the elevating platform of the only one column assembly.

7. The device according to claim 6, wherein at least one of:
   the threaded connection with the respective leading screw is via a respective nut, the respective nut being in threaded connection with the respective leading screw and fixedly connected to the respective elevating platform; and
   each of the elevating platforms comprises a respective threaded passage running therethrough, wherein the respective threaded passage is in threaded connection with the respective leading screw of the respective elevating mechanism of which the respective elevating platform is a part.

8. The device according to claim 6, wherein each of the elevating mechanisms further comprises at least one respective guiding rail disposed along the respective column of the respective column assembly of which the respective elevating mechanism is a part, the respective elevating platform of the respective elevating mechanism arranged to slide along the respective guiding rail of the respective elevating mechanism so that the respective guiding rail guides the respective elevating platform to ascend and descend.

9. The device according to claim 8, wherein at least one of:
each of the elevating platforms is in sliding connection with the respective guiding rail of the elevating mechanism of which the respective elevating platform is a part via a respective slider, the respective slider being in sliding connection with the respective guiding rail and the respective elevating platform being fixedly connected to the respective slider; and
each of the elevating platforms comprises a respective passage running therethrough to receive the respective guiding rail of the elevating mechanism of which the respective elevating platform is a part.

10. The device according to claim 1, wherein said detector mounting structure further comprises a connection beam connected between the columns of the two column assemblies.

11. The device according to claim 1, wherein one end of said cross beam is fixedly hinged to one of said elevating platforms of the two column assemblies, and the other end of the said cross beam is elastically coupled to the other of said elevating platforms of the two column assemblies.

12. The device according to claim 1, wherein the scanning drive/control sub-system comprises:
a servo driving motor arranged to drive the leading screw in each of the column assemblies; and
a servo synchronous controller for controlling the synchronous operation of the servo drive electrical motors.

13. The device according to claim 1, wherein the device further comprises a main control computer providing a man-machine interaction interface to control the work of the device according to the operator's instructions and to form and display images according to imaging data.

14. The device according to claim 1, wherein said detector is a detector array in a planar form.

* * * * *